US005890910A

United States Patent [19]

Tsurumi et al.

[11] Patent Number: 5,890,910

[45] Date of Patent: Apr. 6, 1999

[54] METHOD OF MANAGING INFORMATION FILES IN A COMMUNICATION KARAOKE APPARATUS AND A COMMUNICATION KARAOKE APPARATUS

[75] Inventors: Kanehisa Tsurumi; Youji Semba, both of Hamamatsu; Yuichi Murai, Tokyo, all of Japan

[73] Assignee: Yamaha Corporation, Hamamatsu, Japan

[21] Appl. No.: 735,645

[22] Filed: Oct. 17, 1996

[30] Foreign Application Priority Data

Oct. 19, 1995 [JP] Japan .................................... 7-270939

[51] Int. Cl.[6] .............................. G10H 1/36; G09B 5/00; A63H 5/00

[52] U.S. Cl. ................................ 434/307 A; 434/307 R; 84/609; 84/634; 455/45; 348/461; 348/552

[58] Field of Search ....................... 434/118, 307 R–309, 434/318, 365; 84/477 R, 609–613, 634–637, 644, 650–652, 662; 379/93.08; 369/1, 2, 32, 47, 48, 58, 178, 192; 360/27, 48, 72.2; 340/825.21, 825.5; 370/329, 527; 395/200.49, 250; 455/2, 4.2, 5.1, 6.3, 45, 68; 347/12; 348/2, 5, 7, 12, 460–468, 473, 474, 552, 563, 734; 345/302; 463/40–43

[56] References Cited

U.S. PATENT DOCUMENTS 5,325,423 6/1994 Lewis .................................... 348/12 X
5,465,240 11/1995 Mankovitz .................................. 369/1
5,488,409 1/1996 Yuen et al. .................................. 348/5
5,532,923 7/1996 Sone ...................................... 84/634 X
5,561,649 10/1996 Lee et al. .............................. 369/58 X
5,561,849 10/1996 Mankovitz ................................ 455/45
5,564,001 10/1996 Lewis ...................................... 345/302
5,570,340 10/1996 Lee et al. .............................. 369/48 X
5,612,681 3/1997 Funahashi et al. ................ 340/825.21
5,619,425 4/1997 Funahashi et al. ............ 434/307 A X

*Primary Examiner*—Joe H. Cheng
*Attorney, Agent, or Firm*—Pillsbury Madison & Sutro LLP

[57] ABSTRACT

A storing unit of a communication karaoke apparatus has a newly released music file storing area, an information file storing area, a necessary information file list storing area, and the like. Information files are used for displaying information such as concert information, and advertisements of stores and goods. The information files are displayed during an intermission of karaoke performances due to music-piece files. When a new release file is downloaded, a necessary information file list is simultaneously downloaded. Based on the necessary information file list, unnecessary information files are deleted from the information file storing area, and only necessary information files among the downloaded information files are written into the information file storing area. Accordingly, only necessary information files can be always stored.

4 Claims, 4 Drawing Sheets

METHOD OF MANAGING INFORMATION FILES IN A COMMUNICATION KARAOKE APPARATUS AND A COMMUNICATION KARAOKE APPARATUS

BACKGROUND OF THE INVENTION

1. Field of the Invention

The invention relates to a method of managing information files in a communication karaoke apparatus by which an unnecessary information file such as that in which the display period expires can be sorted out among information files containing CM (commercial) to be displayed during an intermission of karaoke performances, and also to a communication karaoke apparatus.

2. Related Art

In a karaoke parlor such as a karaoke box, during an intermission of karaoke music pieces, various kinds of information, especially, CM information including concert information, advertisements for various goods and stores such as bars, and newly released music information are displayed to a customer. Information files storing the information are downloaded from a host apparatus together with music-piece data, and then stored in a storage apparatus such as a hard disk.

It is useless to display concert information after the day of the concert, and newly released music information is not necessary when next newly released music information is downloaded. Unlike karaoke music pieces (music-piece files) which may be requested forever after the release thereof, therefore, each information file has a limit of the useful time period. If the time period expires, the file becomes unnecessary. It is desired that such an unnecessary information file is deleted. In a karaoke apparatus, originally, music-piece files for performing karaoke music pieces are not deleted. Accordingly, there has been no idea to provide a conventional karaoke apparatus with an update function for, for example, deleting a file.

The host apparatus should download music-piece files and information files to an extremely large number of communication karaoke apparatuses (terminal apparatuses), so that all of music-piece files and all of information files are downloaded to any of the communication karaoke apparatuses. The downloaded information files include, however, information files which are not necessary to some communication karaoke apparatuses, such as a CM file which is to be televised only in a limited area. Since a conventional communication karaoke apparatus cannot perform the maintenance of the downloaded information files as described above, a waste storing area for storing a useless information file is disadvantageously required.

SUMMARY OF THE INVENTION

It is an object of the invention to provide a method of managing information files in a communication karaoke apparatus in which a necessary information file list is sent from a host apparatus, and the maintenance of information files can be performed based on the necessary information file list in the communication karaoke apparatus, also such a communication karaoke apparatus.

According to the present invention, there is provided a method of managing information files in a communication karaoke apparatus in which, when a music-piece file for performing a karaoke performance by driving musical sound synthesizing means and image synthesizing means, and an information file for displaying various kinds of information during an intermission of the karaoke performance by driving the musical sound synthesizing means and the image synthesizing means are downloaded from a host apparatus and stored in the communication karaoke apparatus, a necessary information file list for designating a necessary information file is downloaded together with the files, and information files to be stored in the communication karaoke apparatus are updated based on the necessary information file list.

According to the present invention, there is provided a communication karaoke apparatus in which a music-piece file for performing a karaoke performance by driving musical sound synthesizing means and image synthesizing means, and an information file for displaying various kinds of information by driving the musical sound synthesizing means and the image synthesizing means are downloaded from a host apparatus and stored in storing means, and information of the information file is displayed during an intermission of the karaoke performance, wherein the communication karaoke apparatus comprises: means for downloading a necessary information file list for designating a necessary information file, together with the musical sound file and the information file; and means for updating information files to be stored in the storing means, based on the necessary information file list.

In the invention, information files for displaying information such as CM between performances of karaoke music pieces are downloaded from a host apparatus together with music-piece files for performing karaoke performances. Usually a karaoke performance is performed based on a music-piece file, and, between performances, various kinds of information such as CM and newly released music information are read from information files and then displayed. Karaoke music pieces (music-piece files) may be requested forever, and therefore the downloaded music-piece files are accumulatively stored without deletion. As for information files, when a contract period for displaying the CM expires or next newly released music information is issued, it is unnecessary to continue the display of the information contained in the files, that is, the information file becomes an unnecessary file. In order to avoid cumbersomeness, music-piece files and information files are commonly downloaded to all of terminal apparatuses (communication karaoke apparatuses), and hence information files which are necessary only for some of the terminal apparatuses are also downloaded to all of the terminal apparatuses.

The necessary information file list is used for individually designating necessary information files for each terminal apparatus, and for deleting unnecessary information files. The necessary information file list is downloaded simultaneously with the download of the music-piece files and information files from the host apparatus to the communication karaoke apparatus. The host apparatus edits an individual necessary information file list for each communication karaoke apparatus. The communication karaoke apparatus deletes unnecessary information files which are previously downloaded and accumulatively stored, based on the necessary information file list, and performs an updating operation for storing only necessary information files among the information files which are now downloaded, or the like. As a result, unnecessary information files are not stored in the communication karaoke apparatus. This results in the saving of the storage capacity.

DETAILED DESCRIPTION OF THE PREFERRED EMBODIMENTS

Figure 1:
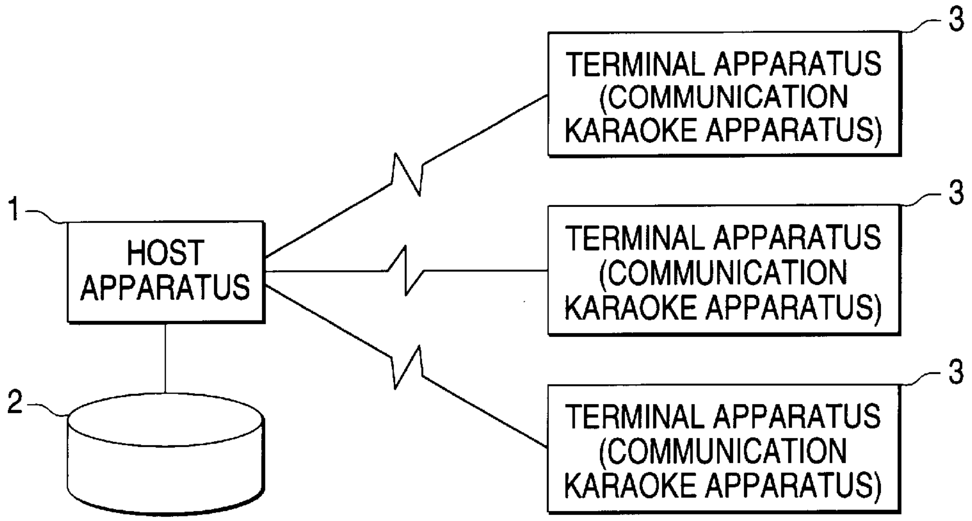
FIG. 1 is a diagram showing the configuration of a communication karaoke system which is an embodiment of the invention.

FIG. 1 is a diagram showing the configuration of a communication karaoke system which is an embodiment of the invention. A communication karaoke apparatus is configured in such a manner that a host apparatus 1 is connected to a plurality of terminal apparatuses, i.e., communication karaoke apparatuses 3 via telephone lines. The telephone lines may be public telephone lines, and the connection of the line may be established as required. A large-capacity storage apparatus 2 is connected to the host apparatus 1. The large-capacity storage apparatus 2 stores music-piece files and information files which are to be downloaded to the communication karaoke apparatuses 3. A music-piece file is a data file for performing a karaoke performance including a header, a musical sound track, a word display track, a voice track, and the like. An information file has substantially the same construction as that of the music-piece file (or configured by a header, a BGM track, a character display track, an announce track, and the like). An information file is a data file for displaying newly released music information, concert information, CM for goods and stores, and the like. Music-piece files and information files of the same release date are stored in a bundle as a release file. Each release file is identified by a release number which is allocated in ascending order of release date (see FIG. 3(B)). A necessary information file list indicating which information files are necessary in each communication karaoke apparatus 3 is also stored in the large-capacity storage apparatus 2.

Figure 2:
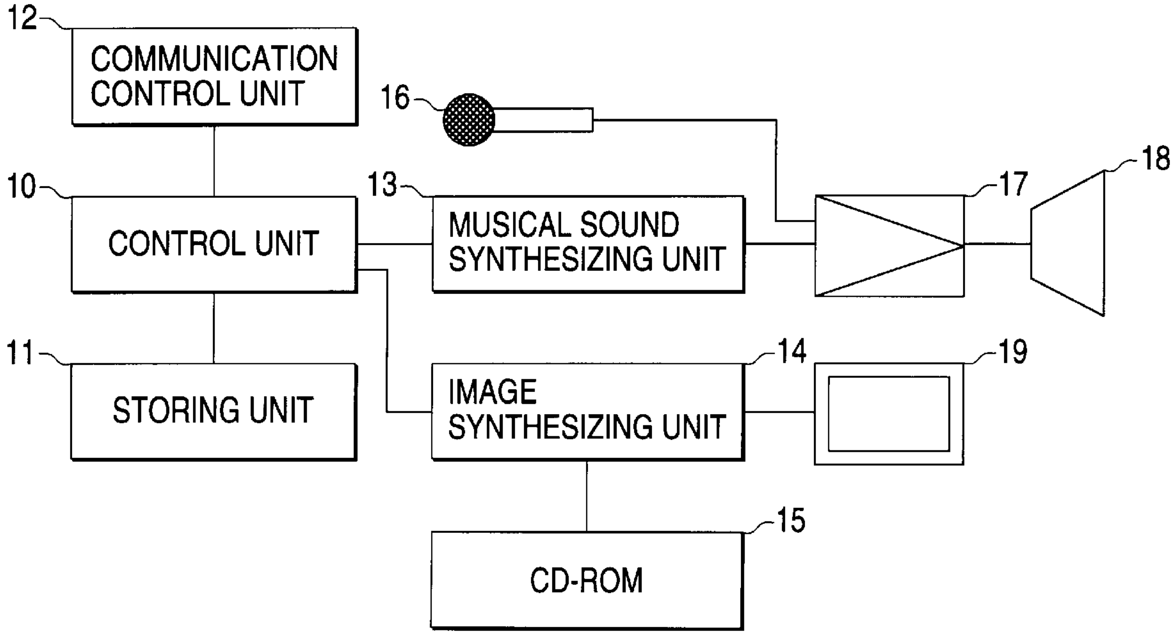
FIG. 2 is a block diagram of a communication karaoke apparatus which is a terminal apparatus of the communication karaoke system.

FIG. 2 is a block diagram of a communication karaoke apparatus which is a terminal apparatus in the communication karaoke system. The communication karaoke apparatus performs a karaoke performance on the basis of a music-piece file received from the host apparatus, and reproduces data of information files so as to display CM and newly released music information between performances of karaoke music pieces. A control unit 10 for controlling the operation of the whole of the apparatus is constituted by a microcomputer. A communication control unit 12, a storing unit 11, a musical sound synthesizing unit 13, and an image synthesizing unit 14 are connected to the control unit 10. The communication control unit 12 is connected to the host apparatus 1 via a public telephone line, and controls the communication with the host apparatus 1 such as the download of release files. The storing unit 11 stores downloaded music-piece files and information files. The musical sound synthesizing unit 13 synthesizes the accompanying sound based on data of a musical sound file (a musical sound track and a voice track), and reproduces voice of a back chorus and the like. The musical sound synthesizing unit 13 reproduces and synthesizes an announce voice and BGM based on data of the information files. The musical sound synthesizing unit is connected to a sound system 17. Signals of synthesized musical sound and reproduced voice are input into the sound system 17. A microphone 16 for singing a song is connected to the sound system 17. A sung voice of a singer is input through the microphone 16 for singing a song. The sound system 17 applies effects such as reverberation to these signals and then amplifies the signals, and then output them to a loudspeaker 18. The image synthesizing unit 14 produces an image which is to be displayed on a monitor 19, based on data of the music-piece file. A CD-ROM player 15 is connected to the image synthesizing unit 14. A background image stored in the CD-ROM is selected based on genre data and the like contained in the music-piece file. The music-piece file contains word display data, and a character pattern of word telop is synthesized based on the data. An image to be displayed on the monitor 19 is generated by synthesizing the background image and the character pattern of word telop. Similarly to the music-piece file, the information file contains data for designating a background image, and character data for displaying CM and newly released music information. On the basis of these data, the image synthesizing unit 14 generates an information screen which is to be displayed on the monitor 19. The image synthesizing unit 14 stores simple graphic patterns (graphic primitive data) such as a circle, a triangle, and the like in addition to character patterns. The image synthesizing unit 14 can generate a screen in which these simple graphics are combined by designating the display of the graphics based on the data of an information file (a character display track).

Figure 3:
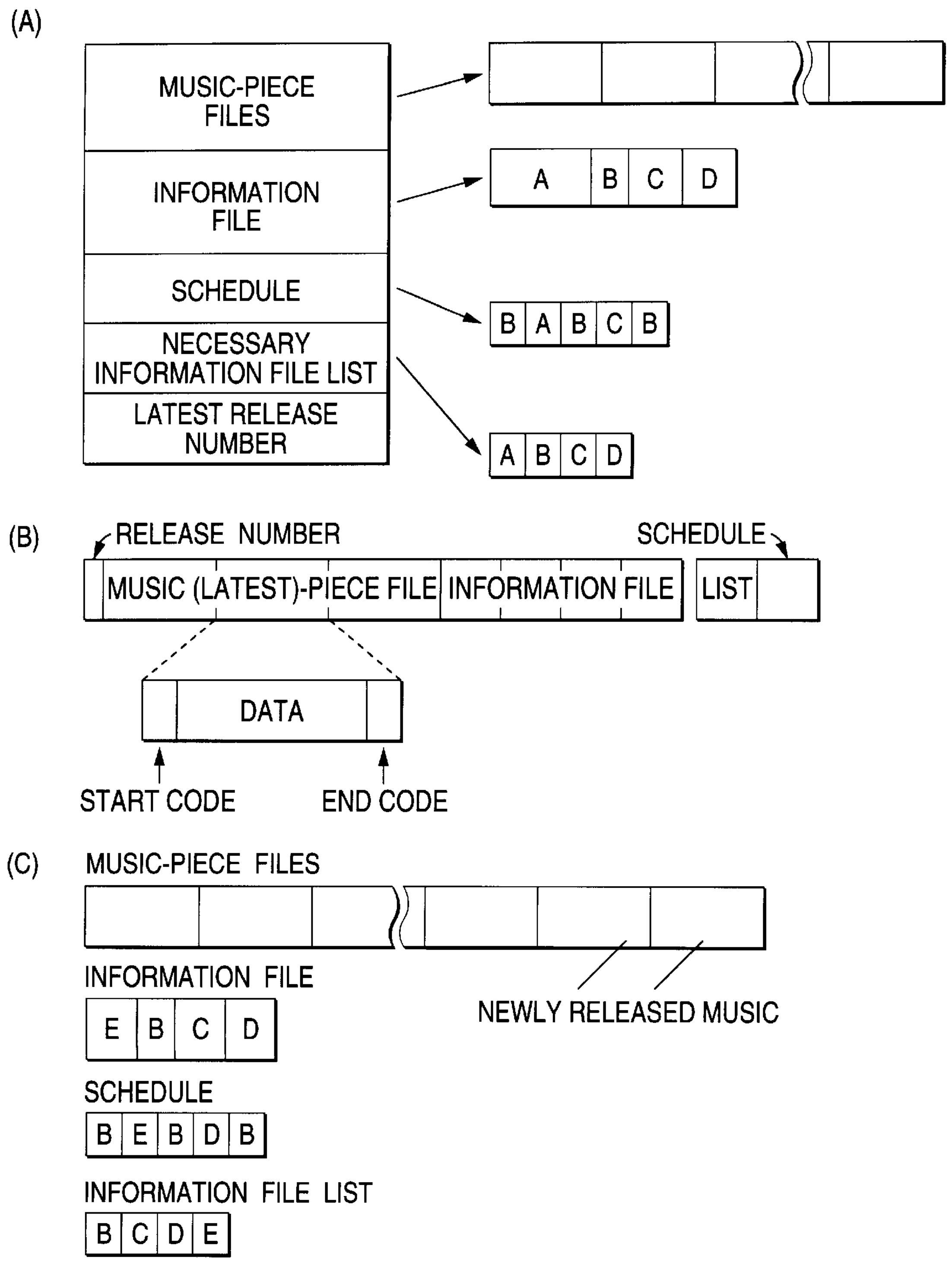
FIG. 3 is a diagram showing the configuration of a storing unit of the communication karaoke apparatus, and that of a downloaded release file.

FIG. 3 is a diagram showing the configuration of the storing unit 11 of the communication karaoke apparatus, and that of a release file sent from the host apparatus 1.

FIG. 3(A) is a diagram showing the configuration of the storing unit 11. In the storing unit 11, storing areas for music-piece files, information files, a schedule, a necessary information file list, and a latest release number are set. The music-piece file storing area stores music-piece files of several thousands of music pieces. Music-piece files downloaded from the host apparatus 1 are added to this area. Each music-piece file is identified by a serial number. The information file storing area stores only necessary information files among the downloaded information files. The necessary information files contain information which is to be currently displayed and that which will be displayed in the near future. In the example shown in FIG. 3(A), information files A, B, C, and D are stored. The schedule storing area stores the order of display of the information files. In the example shown in FIG. 3(A), the schedule in which the information files are displayed in the sequence of B, A, B, C, and B is stored. The information files are data files for displaying information of CM and the like as described above, and are displayed during an intermission of karaoke performances (between performances of music pieces). After a karaoke performance, therefore, the communication karaoke apparatus 3 displays the information files in the above-mentioned order as far as time permits, and, when the next karaoke performance is to be started, immediately terminates the display of the information files. As for the information file of which the display has been terminated in the middle of the information, the information is displayed from the start thereof during the next intermission of music pieces.

The necessary information file list is used for designating necessary information files among the downloaded information files and information files which have been already stored in the information file storing area. The necessary information file list is edited by the host apparatus 1 for each communication karaoke apparatus 3 together with the schedule, and downloaded in a manner that it is attached to the release files. As described above, information files which are designated to necessary information files include the information files which are to be currently displayed, those which will be displayed in the near future although they are not currently displayed, or those in which the display period expires. In the example shown in FIG. 3(A), four information files A, B, C, and D are designated as necessary information files. When a release file is downloaded, the communication karaoke apparatus stores only information files designated in the necessary information file list among information files included in the release file, into the information file storing area, and the other information files are discarded. In addition, information files which are not designated in the necessary information file list among the information files already stored in the information file storing area are deleted. The latest release number is the release number of the release file which is lastly downloaded from the host apparatus 1. In the next download, a release file having the next release number is downloaded.

FIG. 3(B) is a diagram showing the configuration of a release file which is downloaded from the host apparatus 1. The release file consists of a release number, one or plural newly released music (music-piece) files, and one or plural information files. In addition, a necessary information file list which is edited for each communication karaoke apparatus, and a schedule are associated. The download is usually performed at an interval of about once a week, so that one release file consists of newly released music files of about ten music pieces, and a several number of information files. The entire release file occupies about 2 to 3 MB. As described above, the release number is a serial number of a release file which is allocated in the ascending order of date. Only latest newly released music files and information files are stored. A newly released music file consists of a start code, data, and an end code.

Release files stored in the host apparatus are common to all of the communication karaoke apparatuses in view of the saving of the storage capacity and the like. Some kinds of newly released music files can be performed by only part of communication karaoke apparatuses. When the release file is downloaded to a communication karaoke apparatus which cannot perform a newly released music file of such a kind, only a start code and an end code of the newly released music file which can be performed by only part of apparatuses are edited, and then only the codes are sent. In other word, the data of the file is not sent so that the amount of communication is saved.

The host apparatus 1 stores a table indicating, for each information file, communication karaoke apparatuses which are allowed to display the information file, the date and time when the information file is displayed, and the frequency of displaying the information file. When the release file is downloaded, the necessary information file list and schedule are edited and transmitted based on the table.

FIG. 3(C) shows an example in which the stored contents of the storing unit 11 having the condition of FIG. 3(A) are subjected to maintenance. When a release file is downloaded, newly released music files included in the release file are added to the music-piece file storing area. A necessary information file list which is sent together with the release file designates information files B, C, D, and E as necessary files. In accordance with the necessary information file list, the communication karaoke apparatus writes the information file E among the information files included in the release file into the information file storing area, and deletes the information file A. In addition, the stored contents of the schedule storing area are changed from BABCB to BEBDB. Thereafter, the information files are displayed in this order.

Figure 4:
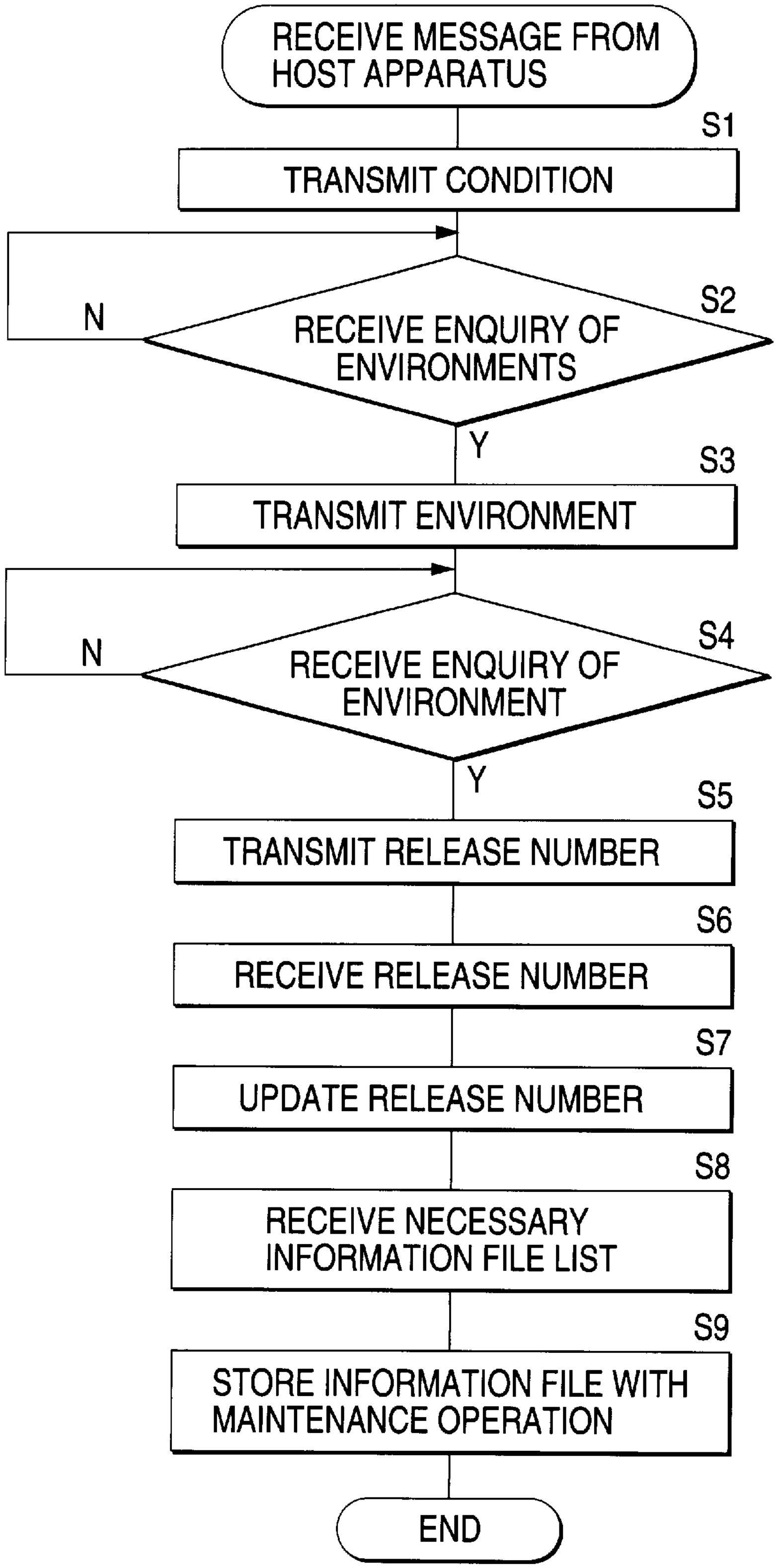
FIG. 4 is a flowchart showing a communication processing operation of the communication karaoke apparatus.

FIG. 4 is a flowchart showing a communication processing operation in a communication karaoke apparatus. When a telegraphic message for requiring the start of download is received from the host apparatus 1, the operation starts. First, the terminal condition of the communication karaoke apparatus is transmitted (S1). The terminal condition is the information indicating whether the apparatus can receive the download of a release file from the host apparatus 1 or not. After the transmission of the information, the communication karaoke apparatus waits until an enquiry of environments is sent (S2). When the enquiry of environments is received, environmental information about the type of the terminal apparatus, location information, an error log, and the like is transmitted (S3). The type of the terminal apparatus is the information indicating the type of the apparatus (the communication karaoke apparatus). Different types of communication karaoke apparatuses have different functions. As described above, music-piece files of some kinds cannot be performed by apparatuses having low-grade functions. In such a case, the host apparatus 1 performs processes such as that for setting data of part of newly released music files so as to be Nul (null) in accordance with the function of the apparatus to which the files are downloaded. The location information indicates the location at which the communication karaoke apparatus is installed. The location information is written when the the apparatus is installed. The host apparatus 1 compares the installation location information with the serial number of the communication karaoke apparatus. When the location of the apparatus is different from that written at the installation, it is judged that the communication karaoke apparatus has been moved without permission. In order to maintain the security of data, therefore, the download of the release file is not performed. In the error log, the abnormality history during the operation of the apparatus is recorded. Abnormality includes an abnormal termination of a karaoke music piece. After the above-mentioned environmental information is transmitted, when the host apparatus 1 judges that it is possible to download the release file, an enquiry of the latest release number is performed. The communication karaoke apparatus waits until the enquiry of release number is transmitted in S4. When the enquiry is transmitted, the release number stored in the latest release number storing area is transmitted (S5). The host apparatus 1 refers to the release number and transmits a release file having a next or succeeding release number, i.e., a release file which is not yet transmitted (S6). If there are plural release files which are not yet transmitted, therefore, the files are successively downloaded. The communication karaoke apparatus temporarily stores the release file in a blank area of the storing area 11, and updates the latest release number (S7). Next, a necessary information file list (including a schedule) is received and then written into a-predetermined storing area (S8). Based on the necessary information file list, files in the information file storing area are sorted out, and only necessary information files among the currently downloaded information files are stored in the information file storing area (S9). Simultaneously with the maintenance operation, newly released music files are additionally written into the music-piece file storing area.

When a plurality of release files are successively downloaded, the host apparatus 1 may edit a plurality of necessary information file lists and schedules in an associated manner with the respective release files. Alternatively, the host apparatus may edit one necessary information file list and schedule for all of the release files.

Figure 5:
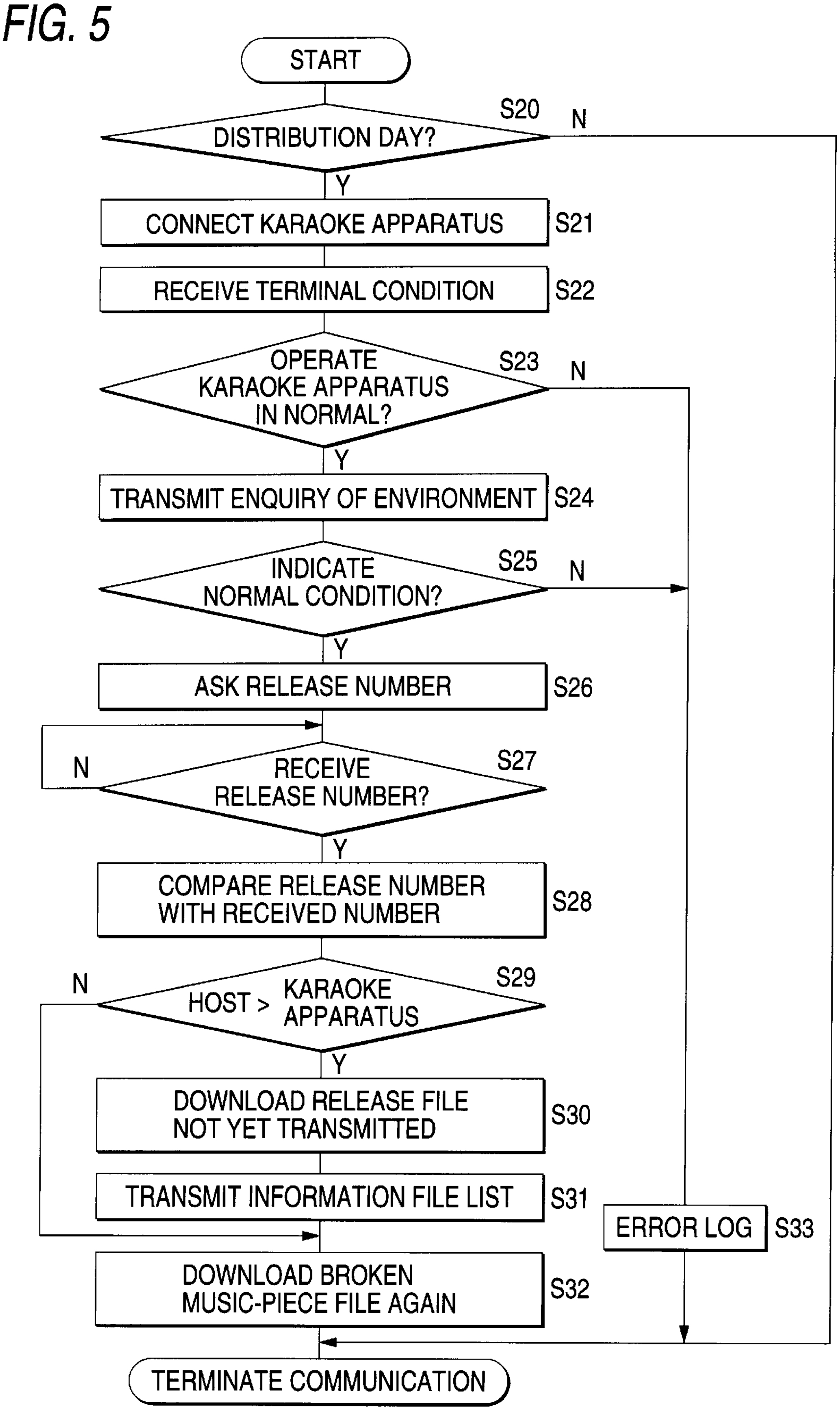
FIG. 5 is a flowchart showing a communication processing operation of a host apparatus of the communication karaoke system.

FIG. 5 is a flowchart showing a communication processing operation of the host apparatus 1. The operation is performed on every distribution day. The distribution day is set to be once a week and in a time period during which communication karaoke apparatuses are not busy, for example, in a day time on Monday. On the distribution day (S20), a public telephone line is connected to a communication karaoke apparatus (S21). When the line is connected to the communication karaoke apparatus, the terminal condition from the communication karaoke apparatus is received (S22). If the information indicates that the communication karaoke apparatus does not normally operate, an error processing is performed (S23) and the communication is then terminated.

If the communication karaoke apparatus normally operates, an enquiry of environments is transmitted (S24). In response to the enquiry, environmental information is transmitted from the terminal apparatus. The host apparatus examines the contents of the information to judge whether the environments are normal or not. If it is judged that they are not normal, for example, in the case where abnormal termination repetitively occurs, an error processing is performed (S33) and the communication is then terminated.

If the contents of the environmental information indicate normal conditions (S25), the latest release number is asked to the communication karaoke apparatus (S26). The host apparatus 1 waits in S27 until the latest release number is transmitted from the terminal apparatus in response to the enquiry. When the latest release number is received, the received number is compared with the release number of a latest release file which is stored in the host apparatus (S28). In the case where it is found as a result of the comparison that there is a release file which is not yet downloaded to the terminal apparatus (S29), the release file which is not yet transmitted is downloaded (S30), and a new necessary information file list is transmitted (S31). In the case where a plurality of release files are downloaded, a plurality of necessary information file lists respectively corresponding to the release files may be transmitted, or one necessary information file list which corresponds to all of the release files may be transmitted. Thereafter, based on the error log transmitted from the communication karaoke apparatus, music-piece files which seem to be broken are downloaded again (S32), and then the communication is terminated.

In the case where a new release file is not downloaded, only a new necessary information file list and/or a new schedule may be transmitted.

In place of the method in which the download is performed when a predetermined day arrives, another method may be employed. For example, the download may be immediately performed when a requirement is transmitted from a terminal apparatus (a communication karaoke apparatus), or when a new release file is edited.

As described above, according to the invention, among information files downloaded from the host apparatus, only necessary information files can be selected and stored based on the necessary information file list. Specifically, unnecessary information files among information files which are already downloaded and accumulatively stored can be deleted, and only necessary information files among information files which are currently downloaded can be newly stored. As a result, it is possible to save the storage capacity of the information file storing unit.

What is claimed is:

1. A method of managing information files in a communication karaoke apparatus, comprising the steps of:

downloading a necessary commercial information file list for designating a necessary information file from a host apparatus to a communication karaoke apparatus, when a music-piece file for performing a karaoke performance by driving musical sound synthesizing means and image synthesizing means, and an information file for displaying various kinds of commercial information during an intermission of the karaoke performance by driving said musical sound synthesizing means and said image synthesizing means are downloaded from a host apparatus and stored in said communication karaoke apparatus and;

updating information files to be stored in said communication karaoke apparatus on the basis of said necessary information file list.

2. A method of managing information files in a communication karaoke apparatus as claimed in claim 1, wherein said necessary information file list is used for designating necessary information files for each one of a plurality of said communication karaoke apparatus, and for deleting unnecessary information files.

3. A communication karaoke apparatus comprising:

storing means for storing a music-piece file for performing a karaoke performance by driving musical sound synthesizing means and image synthesizing means, and an information file for displaying various kinds of commercial information by driving said musical sound synthesizing means and said image synthesizing means which are downloaded from a host apparatus;

downloading means for downloading a necessary commercial information file list for designating a necessary information file, together with said musical sound file and said information file from said host apparatus; and updating means for updating information files to be stored in said storing means, based on said necessary information file list, wherein information of said information file is displayed during an intermission of the karaoke performance.

4. A communication karaoke apparatus as claimed in claim 3, wherein said necessary information file list is used for designating necessary information files for each one of a plurality of said communication karaoke apparatus, and for deleting unnecessary information files.

* * * * *